Patented Feb. 12, 1924.

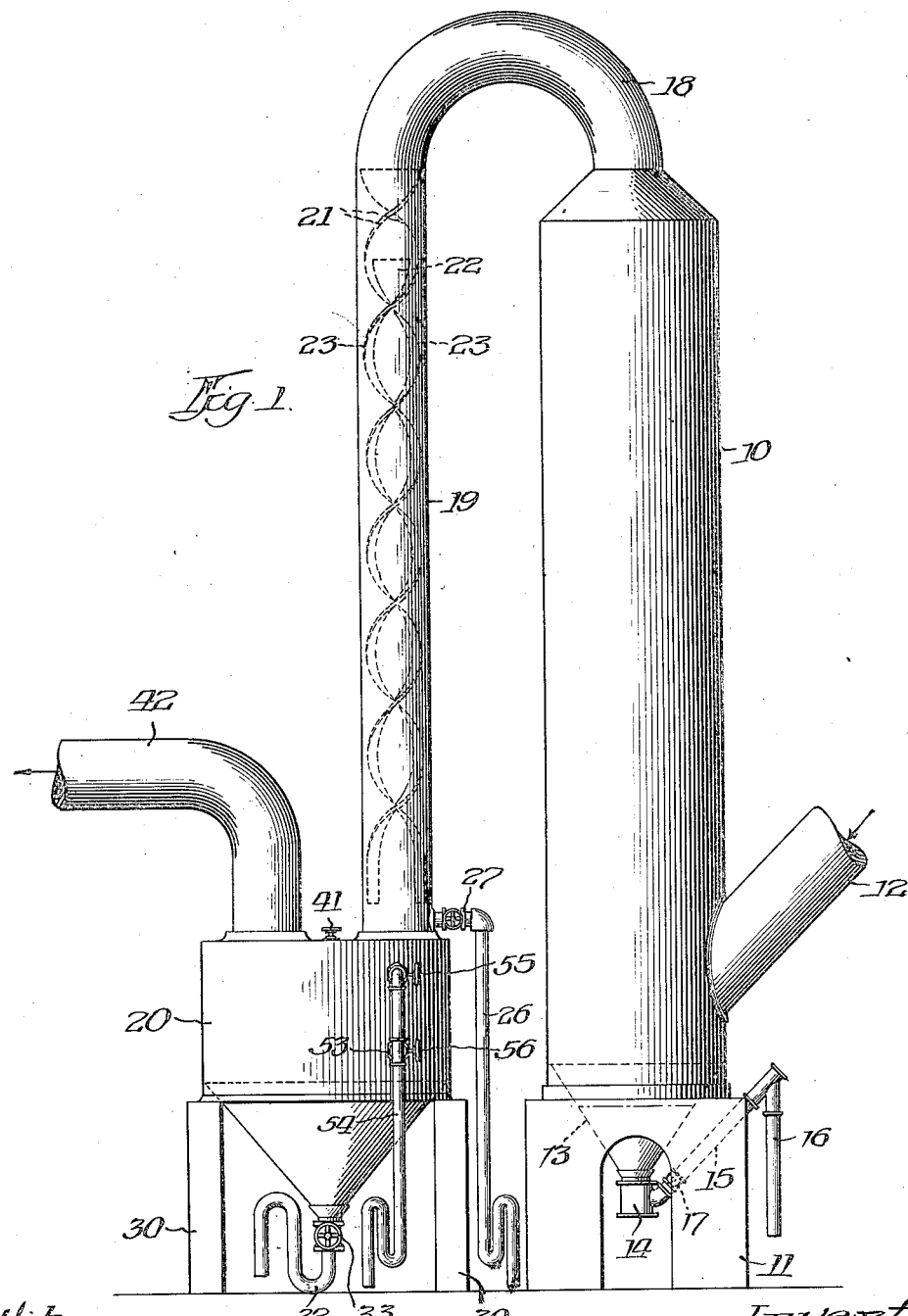

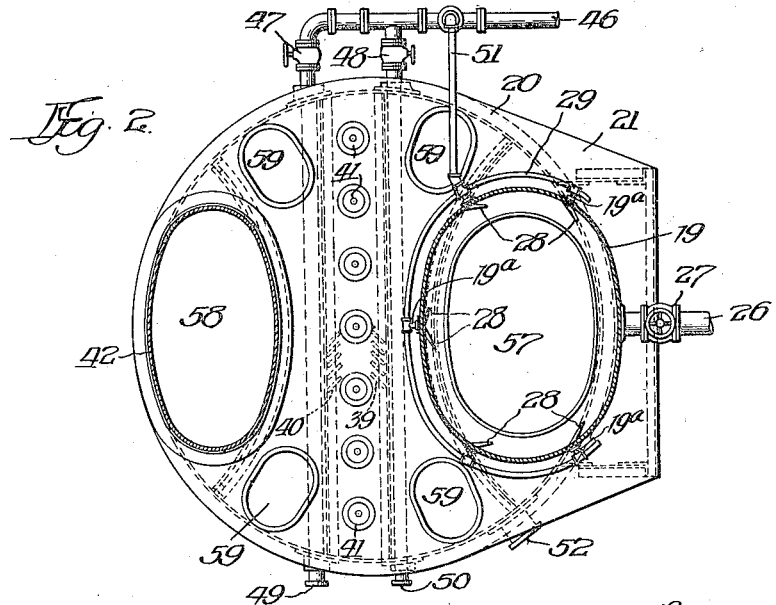

1,483,348

UNITED STATES PATENT OFFICE.

JOHN C. HAYES, JR., AND HARRY L. WETHERBEE, OF CHICAGO, ILLINOIS, ASSIGNORS TO FREYN, BRASSERT & COMPANY, OF CHICAGO, ILLINOIS, A CORPORATION OF MAINE.

MEANS FOR CLEANING AND DRYING BLAST-FURNACE GAS.

Application filed November 11, 1918. Serial No. 262,025.

*To all whom it may concern:*

Be it known that we, JOHN C. HAYES, Jr., and HARRY L. WETHERBEE, both citizens of the United States, residing at Chicago, in the county of Cook and State of Illinois, have invented certain new and useful Improvements in Means for Cleaning and Drying Blast-Furnace Gas, of which the following is a specification.

Our invention is a means for cleaning and drying blast furnace gas and is an improvement upon the type of apparatus disclosed in Patent Number 1,169,764 to H. S. Brassert, said improvement consisting in one of its aspects in effecting a preliminary separation of entrained water particles from the gas as it is conducted from a gas washer or scrubber to a gas drier. According to the present invention, there is imparted a whirling motion to the gas as it is being conducted from a gas washer or scrubber to a gas drier, the centrifugal action of the whirling gas being utilized to throw entrained water particles against the walls of the conduit through which the gas is being conducted, whereby a preliminary separation of the moisture is obtained and a preliminary separation of dust particles is also obtained inasmuch as the water particles carry dust particles which latter separate from the water particles when impinged against the walls of the conduit.

An object of our invention is the production of a complete unitary structure which will be compact and occupy a small amount of space and which will completely clean and dry blast furnace gas at a continuous operation for various uses in connection with blast furnace operations.

A further object of the invention is the provision of an apparatus which will throw out the drops or globules of water and the particles of dust and dirt entrained therein which is carried by the gas after it is washed, without breaking up the drops or globules of water while they are in the path of the travel of the current of gas, and thus releasing the dirt and dust which would continue to be carried by the gas These and other objects of our invention will be more fully and better understood by reference to the accompanying drawings and in which—

Figure 1 is a view in elevation of our improved gas cleaner and drier;

Figure 2 is a top view of the gas drier proper showing the inlet and outlet pipes;

Figure 3 is a vertical sectional view of the drying portion of the apparatus showing the course of the gas as it passes through the said portion.

Referring now specifically to the drawings and in which like reference characters indicate like parts throughout, a vertical tower or gas washer 10 is provided having an inlet pipe 12 by means of which blast furnace gas is conducted into the vertical washer. The gas washer 10 is mounted upon a suitable base 11 and has a conical or hopper shaped bottom 13 within which the water used for the purpose of washing the gas is collected. A trap 14 is provided at the bottom of the conical hopper 13 to which is connected an upwardly extending drain pipe 15 having attached to its outer end a downwardly extending pipe 16, this arrangement thus affording means for the carrying away of the water from the conical hopper 13. A valve 17 is inserted between the pipe 15 and the trap 14 through which the water is drained from the hopper 13 as desired. The vertical gas washer 10 may be of any approved design or construction, with any suitable arrangement of water pipes so as to bring the gas into contact with water as it passes upward through the vertical washer 10, a satisfactory type being disclosed in Patent No. 1,169,765 to Brassert and Bacon. Secured to the top of the gas washer 10 is a pipe 18, curved and connected to a downwardly extending pipe 19 leading to a cylindrical or oval shaped drum or drier 20. Mounted within the pipe 19 at the upper end and immediately adjacent to its junction with the curved pipe 19 is a pair of downwardly extending spiral plates 21, 21, leading around a triangular shaped member 22 secured to the wall of the pipe 19, which thus imparts to the blast furnace gas a rotary movement upon its entering the vertical pipe 19. A set of spirals 23, 23, secured to the inner wall of the vertical pipe 19 and continuing to the bottom of the pipe 19 immediately adjacent to the point where the pipe 19 is secured to the drum 20 which has a top plate 21ª secured thereto, the top plate 21ª having an inlet opening 57 and an outlet opening 58 therein through which the blast furnace gas passes. Manholes 59, 59, in the top plate 21 afford means of access to the inside of the drum 20. The vertical pipe 19 rests upon the top plate 21ª of the drum 20 and may be secured thereto if desired and is positioned over the inlet opening 57 in the top member 21ª. The pipe 19 may be of a larger diameter than the opening 57. Secured to the top plate 21ª and approximately of the same diameter as the inlet opening 57 in the drum 20 is a short pipe section 24, which extends upwardly into the vertical pipe 19, a trough 25 being thus formed between the lower end of the pipe 19 and the pipe section 24 within which the water collects which is thrown out of the gas by reason of the revolving motion of the gas acquired while it is passing through the pipe 19, as hereinafter described. An outlet pipe 26 connected to the bottom of the pipe 19 is provided, to which is secured an ordinary valve 27 which can be opened to allow the water to drain from the trough or trap 25 when the trough 25 is washed or flushed out as hereinafter described. Mounted within the outside wall of the pipe 19 immediately adjacent the trough 25 and extending through the wall of the pipe 19 is a set of short pipes 19ª to which are secured spray nozzles 28, 28, through which water is forced from a suitable supply pipe 29, each of said nozzles being turned so as to direct the flow of water around the trough 25 towards the outlet pipe 26, thus carrying off dust particles, dust laden water, dirt or other matter which may lodge within the trap 25, through the outlet pipe 26, and carrying out any foreign particles, dirt, etc. which is lodged within the trough 25.

The drum 20 is mounted upon a suitable base 30 such as concrete or the like and has secured thereto a conical or hopper shaped bottom 31, from the bottom of which a drain pipe 32 leads to any desired point and is controlled by a valve 33 secured to the drain pipe 32. Secured to the top 21 of the drum 20 by means of an angle iron 34 or any suitable fastening means is a downwardly extending semi-circular plate 36, the outer marginal edges of the plate 36 being in contact with the outside circular wall of the drum 20 and extending downwardly to approximately the top of the hopper bottom of the gas drier 31. The bottom of the semi-circular plate 36 is cut angularly as at 37 in order that the gas passing downwardly and around the plate 36 may be evenly distributed. Secured to the top plate 21 of the drum 20 at the inner edge of the outlet pipe hereinafter described is a similar downwardly extending plate 38 whose outer marginal edges are in contact with the outer wall of the drum 20 in the same manner as the plate 36. Mounted along the median line of the drum 20 and extending across the said drum is a series of angularly disposed baffle plates 39 and 40 having a set of scrapers 41, 41, mounted between the rows of baffle plates, the scrapers being movable vertically between the rows of baffle plates and resting normally at the bottom of the baffle plates as shown in Fig. 3, these scrapers being for the purpose of cleaning the baffle plates so as to insure a free unobstructed passage-way between the baffle plates at all times. Secured to the drum 20 is a gas outlet pipe 42 which conducts the gas to any desired point such as a stove or the like. Secured to the bottom of the frame carrying the baffle plates 39 and 40 is a downwardly extending partition 43 extending transversely across the hopper 31, the partition 43 preventing the gas from passing downwardly across the top of the hopper and through the outlet pipe 42. Extending transversely across the top of the drum 20 is a pair of water pipes 44 and 45, these water pipes having perforations on their sides immediately adjacent the row of baffles 39 and 40 for the purpose of washing down the baffles and removing therefrom any dirt or foreign substance adhering to the surface of the baffle plates. A supply pipe 46 is provided which is connected to the transversely extending pipes 44 and 45 and furnishes a supply of water for the purpose of washing down the baffles. Valves 47 and 48 are interposed between the supply pipe 46 and the transversely extending pipes 44 and 45 to control the supply of water for use in washing down the baffle plates. The pipes 44 and 45 are closed by means of plugs 49 and 50 inserted at their ends. A pipe 51 leading from the supply pipe 46 to the pipe 29 supplies water to the nozzles for the purpose of washing out foreign material which settles in the trough 25 at the bottom of the vertically extending pipe 19. A gate valve of ordinary construction may be placed in the pipe 51 so as to control the supply of water passing to the nozzle 28.

It will be understood that water is allowed to collect in the hopper bottom 31 of the drum 20 so as to cover the lower edge of the downwardly extending partition 43, and through the use of the gate valve 33 the hopper and drum may be filled with water at any desired point. Upper and lower openings 52 and 53 respectively, are provided in the drum within which overflow pipes are inserted connected to a downwardly extending drain pipe 54. Valves 55 and 56 respectively control the height to which the water may rise within the drum 20.

In the operation of the device it will be understood that blast furnace gas enters the washer through the inlet pipe 12, passes upward through the vertical washer into the pipe 18 and downward into the vertically extending pipe 19. The spiral plates 21, 21, in the top of the vertically extending pipe 19 and the triangular shaped member 22 give the gas an initial whirling motion as it enters the pipe 19, which motion is accelerated by the spiral plate 23 as the gas passes through the downwardly extending pipe 19. The gas thereupon passes into the drum 20 through the inlet opening 57 in the top of the gas drier, thence downwardly around the bottom of the vertically extending semi-circular plate 36, thence upwardly back of the plate 36, thus making a complete change in the direction in which the gas is passing around the bottom of the plate 36, thence through the spaces between the angularly disposed baffle plates 39 and 40 into the space immediately back of the vertically extending plate 38, thence downwardly around the bottom of the plate 38 where the gas as caused to make another complete change in its direction of flow, thence upward into the outlet pipe 42.

It will thus be understood that by the whirling motion given the gas as it passes through the pipe 19 the drops or globules of water carried therein will be thrown outward by centrifugal action and impinged against the walls of the pipe 19 and also against the spiral 23, carrying with them the small particles of dust and dirt entrained therein. The dust laden water will run down the walls of the pipe 19 and the spirals 23 and become trapped in the trap or trough 25. If the trap becomes full to overflowing, the dust laden water will flow over the edge of the upstanding pipe 24 and downward into bottom of the drum 20. An additional quantity of the moisture will be thrown out of the gas as it passes around the lower end of the plate 36, and then as the gas strikes against the baffles 39 and 40 the moisture in the gas will be impinged against the said plates where it will collect and flow downward into the hopper bottom 31 and out through the drain pipe 32 controlled by the valve 33. Dust deposited upon contact surface may be flushed off by an intermittent spraying device. The gas after passing through the baffle plates as heretofore described makes a right angle turn downward around the end of the vertical plate 38, making another complete change of direction in its flow and throwing out a remaining large portion of the moisture which remains in the gas.

The drier 20 is of materially greater diameter or cross sectional area than the conduit 19 for the purpose of permitting expansion of the gas when it escapes from the bottom of the chamber defined by the partition 36 and the cooperating wall portion of the drier, which expansion in itself effects a separation of the dust particles in the well known manner, and such separated dust particles gravitate into the hopper bottom portion of the drier.

It will be thus understood that the gas after leaving the washer flows along a practically unobstructed passage until it reaches the baffles, during which, by reason of the whirling motion in the pipe 19 and the right angled turn which it makes around the plate 36, the drops or globules of water are thrown out in their entirety and without being broken up so as to release the particles of dust and dirt entrained therein.

It will be also understood that by allowing the water to rise in the drum 20 above the lower ends of the members 36 and 38 an effective water seal may be provided to completely shut off the flow of the gas as it passes through the apparatus to the stoves and the flow of gas can thus be effectively cut off at any time desired. A drain pipe 53 having two valves 55 and 56 therein provide means for draining the water out of the seal at the top at two different levels for purposes of inspection if it is desired at any time.

It will thus be seen that we provide in a unitary structure, occupying a small and compact space, a complete gas washing and drying installation and which will effectively clean blast furnace gas and dry it sufficiently so that it can be consumed in boilers, blast furnace stoves, or other heating furnaces.

A very important feature of the present invention resides in utilizing the conduit 19 for drying and separating purposes, such conduit not having heretofore been utilized for such purposes, and the advantage of such utilization of the conduit 19 resides in the fact that additional drying and separating effects are obtained without adding to the length of the course through which the gas is conducted for drying and cleaning the same preparatory to conducting the dried and cleaned gas to a point of use.

While we have described more or less precisely the details of construction, we do not wish to be understood as limiting ourselves thereto, as we contemplate changes in form and the proportion of parts and the substition of equivalents as circumstances may suggest or render expedient without departing from the spirit or scope of our invention.

We claim:

1. The combination with a gas washer including a casing having a gas inlet and a gas outlet, a gas drier disposed externally of the washer and including a casing having dust and liquid separating means therein and also provided with a gas inlet and a gas outlet, and a conduit leading continuously from the gas outlet of the washer to the gas inlet of the drier, of means within said conduit to effect separation of dust particles from washed gas passing through the conduit, and means in advance of the drier for trapping said separated dust particles and dust laden water.

2. The combination with a gas washer including a casing having gas inlet and a gas outlet, a gas drier disposed externally of the washer and including a casing having dust and liquid separating means therein and also provided with a gas inlet and a gas outlet, and a conduit leading continuously from the gas outlet of the washer to the gas inlet of the drier, of means within said conduit to effect separation of dust particles from washed gas passing through the conduit, means in advance of the drier for trapping said separated dust particles and dust laden water, and means for carrying off trapped particles and water.

3. The combination with a gas washer including a casing having a gas inlet and a gas outlet, a gas drier disposed externally of the washer and including a casing having dust and liquid separating means therein and also provided with a gas inlet and a gas outlet, and a conduit leading continuously from the gas outlet of the washer to the gas inlet of the drier, of means to whirl washed gas passing through the conduit to effect by centrifugal action separation of dust laden water and dust particles from washed gas passing through the conduit and means in advance of the drier for trapping said separated dust particles and dust laden water.

4. The combination with a gas washer including a tower having a lower gas inlet and an upper gas outlet, a gas drier disposed externally of and adjacent the base of the tower and including a casing having dust and liquid separating means therein and provided with a gas outlet and a gas inlet, the latter being below the gas outlet of the tower, and a conduit leading continuously from the gas outlet of the tower downwardly to the gas inlet of the drier, of means within said conduit to effect separation of dust laden water and dust particles from washed gas passing through the conduit, and means in advance of the drier for trapping said dust particles and dust laden water.

5. The combination with a gas washer including a casing having a gas inlet and a gas outlet, a gas drier disposed externally of the washer and including a casing having dust and liquid separating means therein and also provided with a gas inlet and a gas outlet, and a conduit leading continuously from the gas outlet of the washer to the gas inlet of the drier, of means within said conduit to effect separation of dust particles from washed gas passing through the conduit, means in advance of the drier for trapping said separated dust particles and dust laden water, the drier being of greater cross sectional area than the conduit to permit expansion of the gas within the drier.

6. The combination with a gas washer including a tower having a lower gas inlet and an upper gas outlet and means within the tower for washing gas passing therethrough, a gas drier disposed externally of the washer and including a casing located near the base of the tower and having dust and liquid separating means therein and also provided with a gas outlet and a gas inlet, the latter being located below the gas outlet of the tower, and a conduit leading continuously from the gas outlet of the tower downwardly to the gas inlet of the drier, of means within said conduit to whirl gas passing through the conduit and to effect by centrifugal action separation of dust laden water and dust particles from washed gas passing through the conduit, and means in advance of the drier for trapping said separated dust particles and dust laden water.

7. A gas drier comprising a vertical casing having a gas inlet at its upper portion, a hopper shaped lower portion provided with a dirt and water discharge, a helical baffle within said casing and terminating at its lower end at a point above the said hopper portion, and a gas outlet extending downwardly into the casing at a point between the lower end of the baffle and said hopper shaped portion and having its open inlet end terminating above said hopper portion.

8. A gas drier comprising a vertical casing having a gas inlet at its upper portion, a hopper shaped lower portion provided with a dirt and water discharge, a helical baffle within said casing and terminating at its lower end at a point above the said hopper portion, and a gas outlet extending downwardly into the casing at a point between the lower end of the baffle and said hopper shaped portion and having its open inlet end terminating above said hopper portion, said hopper shaped portion being of greater cross sectional area than the upper portion of the casing to permit expansion of the gas within said hopper shaped portion.

9. The method of cleaning furnace gas which consists in washing the gas, then causing the washed gas with entrained moisture to whirl through a closed conduit and thereby separating moisture and dust particles by centrifugal action, then permitting the gas to expand in a closed receptacle, and then causing the expanded gas to abruptly change its direction of flow within the receptacle.

10. In combination, a gas washer tower, a gas drier below the top of the gas washer tower, a conduit leading from an upper portion of the tower downwardly to the top of the drier, means within the conduit to effect whirling of washed gas passing downwardly through the conduit, an open top trough within the conduit adjacent the top of the drier and having its outer wall constituted by the conduit, means for admitting water into the trough, and means for conducting water and separated articles from the trough.

11. In combination, a gas washer tower, a gas drier below the top of the tower and provided in its top with a gas inlet opening and an upstanding flange surrounding said opening, a conduit leading from an upper portion of the tower downwardly to the inlet opening in the top of the drier, the bottom of the conduit surrounding and spaced from the upstanding flange of the drier and defining with said flange an open top trough, means for admitting water to the trough, means for conducting water and separated particles from the trough, and means to effect whirling of washed gas passing downwardly through the conduit.

Signed at Chicago, State of Illinois, this 7th day of November, A. D., 1918.

JOHN C. HAYES, Jr.
HARRY L. WETHERBEE.